(12) United States Patent
Driscoll (10) Patent No.: US 9,729,521 B2
(45) Date of Patent: *Aug. 8, 2017

(54) METHODS AND SYSTEMS FOR AUTO-COMMISSIONING OF DEVICES IN A COMMUNICATION NETWORK

(71) Applicant: Honeywell International Inc., Morris Plains, NJ (US)

(72) Inventor: Kevin Raymond Driscoll, Maple Grove, MN (US)

(73) Assignee: Honeywell International Inc., Morris Plains, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/267,334

(22) Filed: Sep. 16, 2016

(65) Prior Publication Data

US 2017/0005997 A1 Jan. 5, 2017

Related U.S. Application Data

(62) Division of application No. 14/473,835, filed on Aug. 29, 2014, now Pat. No. 9,450,925.

(51) Int. Cl.
*H04L 29/00* (2006.01)
*H04L 29/06* (2006.01)
(Continued)

(52) U.S. Cl.
CPC ........ *H04L 63/0428* (2013.01); *H04L 9/0643* (2013.01); *H04L 41/0809* (2013.01);
(Continued)

(58) Field of Classification Search
CPC ......... H04L 12/56; H04L 45/74; H04L 69/08; H04L 67/18
See application file for complete search history.

(56) References Cited

U.S. PATENT DOCUMENTS 6,366,610 B1 4/2002 Loyer et al.
6,760,440 B1 7/2004 Driscoll
(Continued)

FOREIGN PATENT DOCUMENTS

DE 19955281 A1 5/2001
DE 102008061901 A1 6/2010

OTHER PUBLICATIONS

Extended Search Report from related European Patent Application No. 15181485, dated May 10, 2016, 12 pp.
(Continued)

*Primary Examiner* — Ghazal Shehni
(74) *Attorney, Agent, or Firm* — Brooks, Cameron & Huebsch, PLLC (57) ABSTRACT

Devices, methods, systems, and computer-readable media for auto-commissioning of devices in a communication network are described herein. One or more embodiments include a method for auto-commissioning of a device added to a communication network, comprising: determining properties of signal transitions of the communication network via a device added to the network while the signal transitions of the communication network are passing unchanged, and processing the signal transitions of the communication network, via the device, based on the properties of the signal transitions.

19 Claims, 8 Drawing Sheets

(51) Int. Cl.
*H04L 12/24* (2006.01)
*H04L 9/06* (2006.01)
*H04L 12/26* (2006.01)

(52) U.S. Cl.
CPC .......... *H04L 63/08* (2013.01); *H04L 63/0876* (2013.01); *H04L 43/087* (2013.01); *H04L 43/0894* (2013.01)

(56) References Cited

U.S. PATENT DOCUMENTS

| | | |
|---|---|---|
| 6,763,363 B1 | 7/2004 | Driscoll |
| 6,795,846 B1 | 9/2004 | Merriam |
| 6,804,354 B1 | 10/2004 | Driscoll |
| 6,850,561 B1 | 2/2005 | Typaldos et al. |
| 7,017,056 B1 | 3/2006 | Lettang et al. |
| 7,277,543 B1 | 10/2007 | Driscoll |
| 7,333,536 B2 | 2/2008 | Sinha et al. |
| 7,340,023 B1 | 3/2008 | Yearsley et al. |
| 8,051,296 B2 | 11/2011 | Driscoll |
| 2007/0248232 A1* | 10/2007 | Driscoll ................ H04L 9/0822 380/280 |
| 2010/0049841 A1* | 2/2010 | Wang ................. H04L 12/2697 709/222 |
| 2012/0173905 A1* | 7/2012 | Diab ....................... H04L 12/66 713/320 |

OTHER PUBLICATIONS

Partial European Search Report from related European Patent Application No. 1518485.2 dated Jan. 21, 2016, 7 pp.

\* cited by examiner

Fig. 6 ns for auto-commissioning of devices in a communication network are described herein. One or more embodiments include a method for auto-commissioning of a device (e.g., encryption device) added to a communication network, comprising: determining properties of signal transitions of the communication network via a device added to the network while the signal transitions of the communication network are passing unchanged, and processing the signal transitions of the communication network, via the device, based on the properties of the signal transitions. As used herein, signal transitions include any discernible change in a communication signal. In addition, as used herein, transmission includes an identifiable (e.g., named) assemblage of signal transitions.

Previous embodiments can be expensive and complicated processes that may require a prohibitively large amount of labor from personnel with skills beyond that found in those who normally visit potential installation sites. Another concern for legacy networks is that the growth in demand for data throughput may exceed the bandwidth of the legacy network. One solution is to add a data compression/decompression device to every node in the network. Again, adding such devices can be an expensive and complicated process that may require a prohibitively large amount of labor from personnel with skills beyond that found in those who normally visit potential installation sites. The expense of this labor is compounded by the expense of hardware dedicated to the process of configuring and commissioning the added devices. What is needed are methods and systems that minimize or eliminate the costly skilled labor for the installation and configuration needed to commission devices added to a network and to eliminate any dedicated configuration and commissioning hardware. The systems and methods can minimize and/or eliminate the costly skilled labor as described herein.

In some embodiments, the device can be a dongle device that can be coupled in-line or tangentially coupled to the link between a computing device and a network interface, such as a modem. In certain embodiments, the device can be a dongle that is utilized as an encryption device (e.g., a dongle that encrypts outgoing transition signals, a dongle that decrypts incoming transition signals, etc.). The device can be coupled to a node within a communication network (e.g., local area network (LAN), wide area network (WAN), etc.). The node can include computing devices that are in communication with each other. For example, a first computing device can communicate with a second computing device by sending signal transitions to the second computing device. In this example, a first device (e.g., a first encryption device, a first added device, etc.) can be coupled to the first computing device and/or a modem of the first computing device and a second device (e.g., a second encryption device, a second added device, etc.) can be coupled to the second computing device and/or a modem of the second computing device. In this example, signal transitions from the first computing device can be processed (e.g., encrypted, compressed, altered, etc.) by the first device. In addition, the signal transitions can be received by the second device and processed (e.g., decrypted, decompressed, unaltered, etc.) for the second computing device.

In some embodiments, the devices can scavenge power from a coupled computing device and/or modem. That is, the devices do not need to be connected to an external power supply (e.g., power supply 110 as referenced in FIG. 1). In some embodiments, the devices can be coupled in-line between a computing device and a modem. That is, the device can be a dongle that is configured to receive a connection from the computing device and receive a connection from the modem and/or cable connecting the computing device to the modem. For example, the computing device can be coupled to the modem via an EIA/RS-232 DB-9 pin connector. In this example, the devices can include a male pin connector and a female pin connector to enable the device to be coupled in-line between the computing device and the modem. A number of different computing systems can utilize different types of connections and the devices can be configured to accept the different types of connections.

In some embodiments, the devices can determine a direction of communication flow (e.g., from a local node or nodes out to the rest of the network, or in from the rest of the network to a local node or nodes). In some embodiments, the determination can be made on the basis of a communication standard requiring a particular gender of connector (e.g., male connector, female connector, etc.) for each direction of communication flow. In some embodiments, the determination can be made according to the presence or absence of certain voltages or currents on particular pins of the connectors.

Communication between the nodes can be processed (e.g., encrypted, decrypted, compressed, decompressed, etc.) by the devices that are coupled to the nodes of the communication network. The devices can automatically commission themselves when they are added (e.g., inserted) into the communication network. The devices can determine properties of signal transitions of the communication network by observing signal transmissions that are transferred through or past the device. The devices can also usurp a number of transmission signals to attach an identification of the device to the usurped transmission signals. In some embodiments, the information that could be sent via usurped transmissions, as described herein, is instead sent during idle times between transmissions.

The devices can use the transmission signals between the number of nodes to validate other devices within the communication system. When used for encryption, once each device is validated, the devices can begin encrypting signal transitions and decrypting signal transitions between the number of nodes within the communication system that also have been validated.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit corresponds to the drawing figure number and the remaining digits identify an element or component in the drawing. Similar elements or components between different figures may be identified by the use of similar remaining digits.

As used herein, "a" or "a number of" something can refer to one or more such things. For example, "a number of devices" can refer to one or more devices. Additionally, the designator "N", as used herein, particularly with respect to reference numerals in the drawings, indicates that a number of the particular feature so designated can be included with a number of embodiments of the present disclosure.

Figure 1:
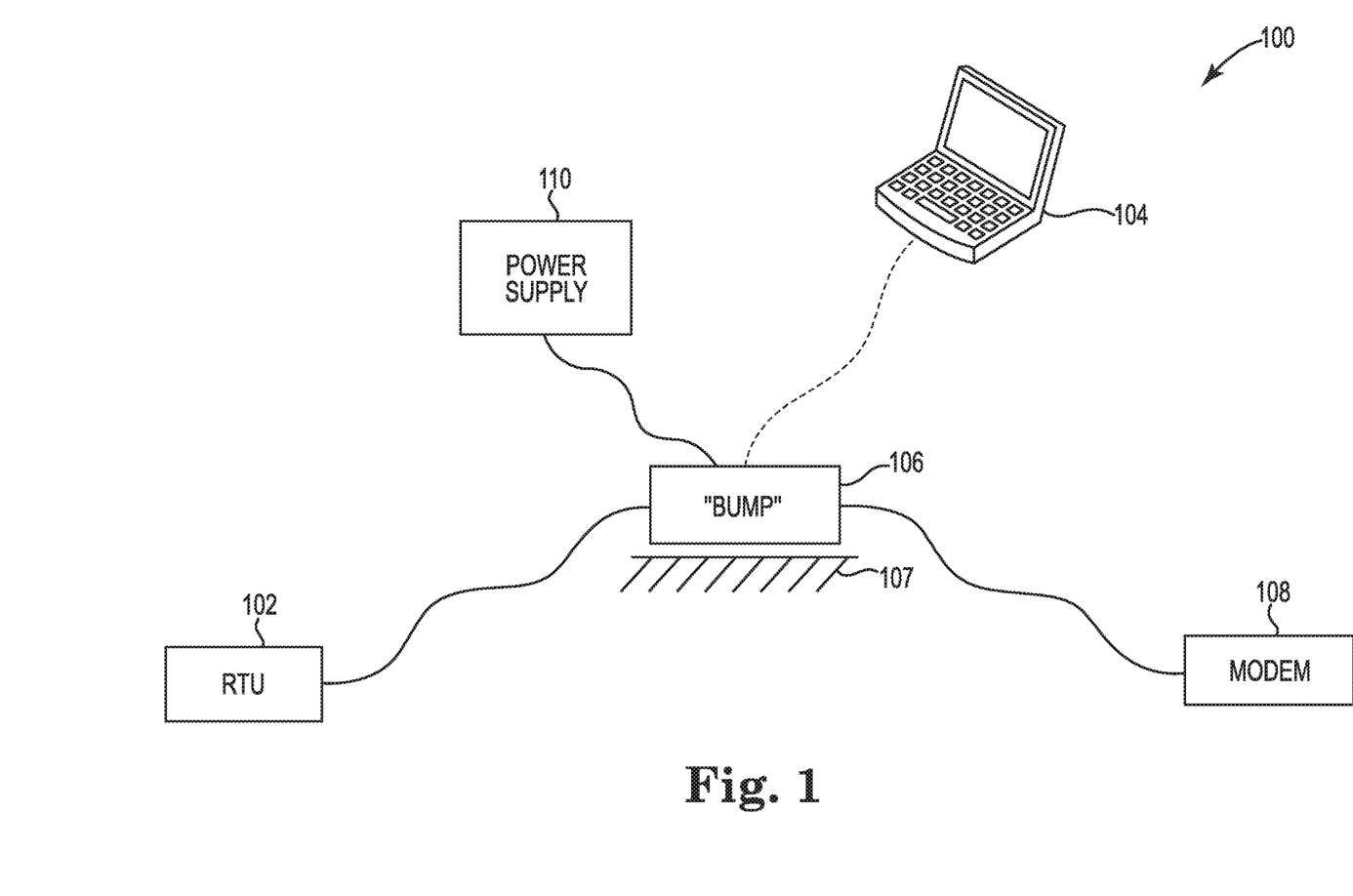

FIG. 1 is a prior art example of an encrypted communication network 100. The encrypted communication network 100 can include a so called "bump in the wire" encryption device 106 that is coupled in-line between a remote terminal unit (RTU) 102 and a modem 108. The "bump in the wire" encryption device 106 can be connected to a power supply 110 and temporarily connected to a computing device 104.

The "bump in the wire" encryption device 106 can be configured by the computing device 104. Configuring the "bump in the wire" encryption device 106 via the computing device 104 can include providing properties of the encrypted communication network 100 to the "bump in the wire" encryption device 106. In addition, configuring the "bump in the wire" encryption device 106 via the computing device 104 can include providing encryption properties to the "bump in the wire" encryption device 106. When computing device 104 is required for configuration and commissioning, the "bump in the wire" encryption device 106 necessarily includes hardware to allow its connection to the computing device 104. This will make the "bump in the wire" encryption device 106 more expensive, more power consumption demanding, and heavier than would be needed if computing device 104 were not required. In some embodiments, the "bump in the wire" encryption device 106 may require a mechanical support 107 to carry the weight of the "bump in the wire" encryption device 106. The mechanical support 107 can be difficult to provide in certain computing environments with limited space.

The encrypted communication network 100 as described herein can require substantial labor from personnel with skills beyond that of the skills of personnel that usually are available at or visit potential installation sites. This additional skilled labor could include a knowledgeable IT engineer and/or IT network manager to configure the "bump in the wire" encryption device 106 for encrypting and/or decrypting signal transitions between the RTU 102 and other computing devices via the modem 108. This configuration and commissioning is typically done via a temporarily connected computing device 104.

Figure 2A:
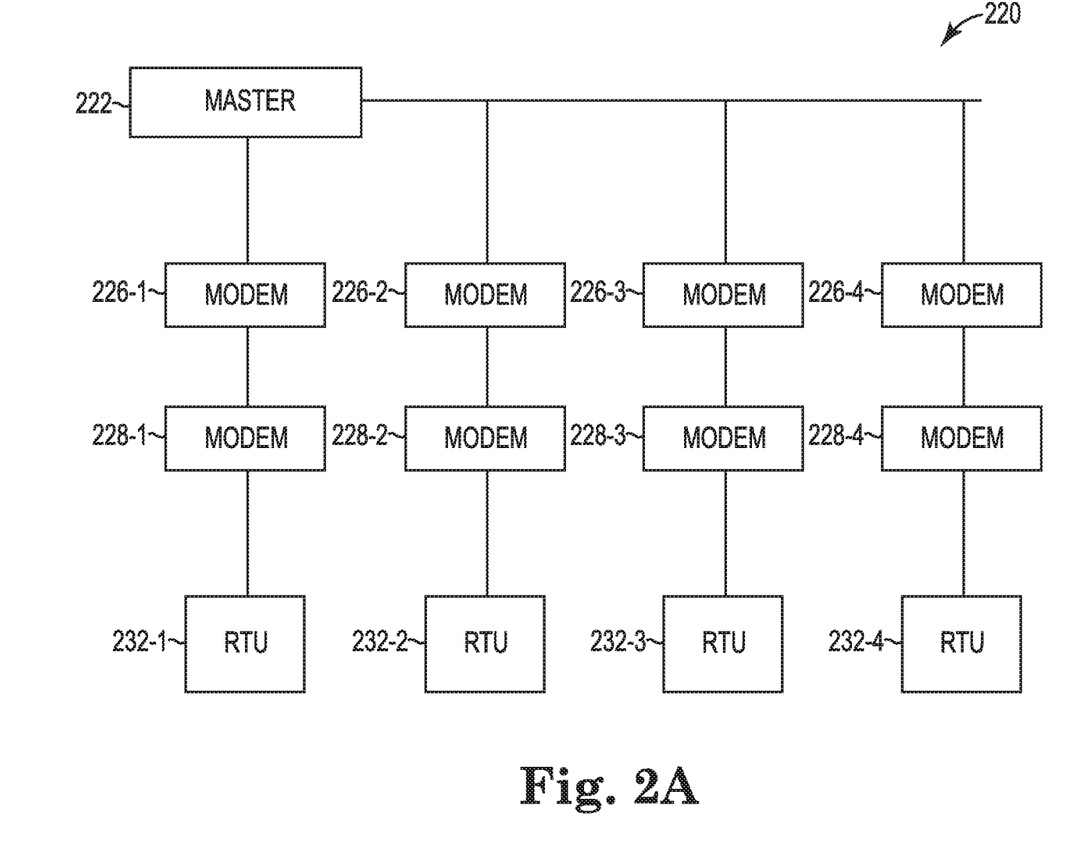

FIG. 2A is an example in a communication network 220 prior to the addition of devices to be commissioned according to one or more embodiments of the present disclosure. The communication network 220 can represent a master/slave communication system. The master/slave communication system can include a master node (master) 222 and a number of slave nodes (slaves) 232-1, 232-2, 232-3, 232-4, which may be RTUs. In some embodiments, the master 222 may be two or more redundant (for fault tolerance) nodes that share the mastership responsibilities.

The master node 222 can be configured to control the number of slave nodes 232-1, 232-2, 232-3, 232-4. That is, the master node 222 can be utilized to control (e.g., change settings, give commands, etc.) each of the number of slave nodes 232-1, 232-2, 232-3, 232-4. For example, the master node 222 can be utilized to change a number of settings of the number of slave nodes 232-1, 232-2, 232-3, 232-4 via a number of transmission signals that can be sent to each of the number of slave nodes via a number of modems 226-1, 226-2, 226-3, 226-4 and modems 228-1, 228-2, 228-3, 228-4. For example, a transmission signal can be sent from the master 222 through a modem 226-1 and through a modem 228-1 to an RTU 232-1. In some embodiments, there may be two or more slave nodes attached to each modem 228-1, 228-2, 228-3, 228-4.

The communication network 220 can be a legacy communication network that is utilized to send and/or receive transmissions from a first user to a second user. The communication network 220 may not have processing capabilities as described herein. For example, the communication network 220 may not be capable of encrypting and decrypting transmissions passing from the master 222 to the number of RTUs 232-1, 232-2, 232-3, 232-4.

Figure 2B:
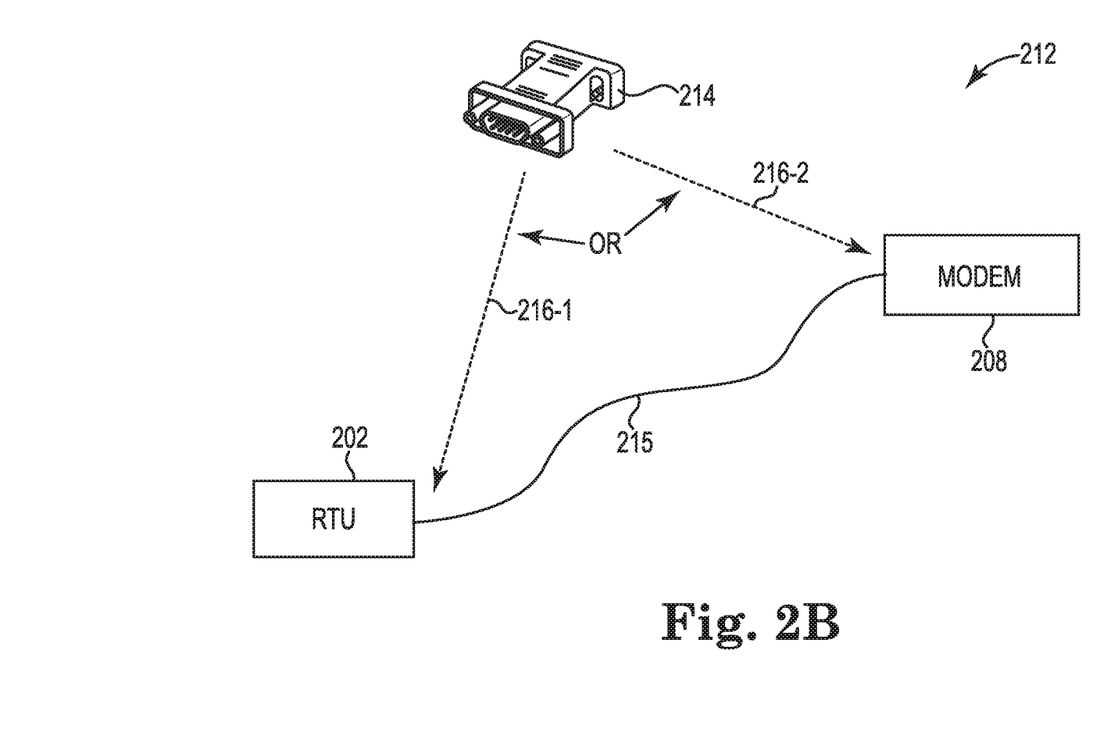

FIG. 2B is an example of a system 212 for auto-commissioning of devices in a communication network according to one or more embodiments of the present disclosure. In some embodiments, the system 212 can be a portion of a relatively larger communication network such as communication network 220 as referenced in FIG. 2A. The system 212 can include a remote terminal unit (RTU) 202 that is coupled to a modem 208. The system 212 can also include a device 214 (e.g., encryption device). As described herein, the device 214 can be a dongle device that includes a connection that is configured to couple the RTU 202 to the modem 208. In some embodiments, the device 214 can be coupled to the RTU 202 and a connection cable 215 at position 216-1. In some embodiments, the device 214 can be coupled to the modem 208 and the connection cable 215 at position 216-2.

The device 214 can be a dongle that is configured to connect to the RTU 202 and/or the modem 208 at an in-line position. In some embodiments, the device 214 can be configured with an EIA/RS-232 DB-9 pin connector that is capable of coupling to the RTU 202 and/or the modem 208. In some embodiments, the device 214 can include a male EIA/RS-232 DB-9 pin connector to couple to the RTU 202 and/or the modem 208 and a female EIA/RS-232 DB-9 pin connector to couple to the connection cable 215.

As described further herein, the device 214 can scavenge power from the RTU 202 and/or the modem 208. In some embodiments, the encryption device can scavenge power from the RTU and/or modem 208 by exploiting EIA/RS-232 design margins to scavenge excess power. For example, the encryption device 214 can use an EIA/RS-232 receiver with a relatively large quantity of termination resistance. In some embodiments, an EIA/RS-232 can use the 22 kilohms (kΩ) available in existing integrated circuits when a standard transmission signal is specified by EIA/RS-232 to utilize 3 to 7 kilohms. The excess kilohms provides left-over current that can be scavenged and utilized to provide power to the device 214. In some embodiments, the signaling rate can be less than the 20 kHz maximum specified by EIA/RS-232. Six of the eight possible EIA/RS-232 signals in a DB-9 connector are handshake signals with very low signaling rates. The lower rates reduce power lost to communication cable reactances, making this power available for scavenging. In some embodiments, a processor within the device 214 can be put into a sleep mode during times when the processor is not in use to conserve power.

In addition, the device 214 can observe transmission signals from the RTU 202 and determine properties of the transmission signals. The determined properties can include, but is not limited to: a bit rate of the signal transitions, a protocol of the signal transmissions, a size of a stop bit, a number of bits between start and stop bits, and/or one or more locations (e.g., addresses) of nodes within the communication system.

The device 214 can utilize the determined properties to configure communication and/or encryption properties that are capable of being used within the communication system. In some embodiments, the device 214 can usurp a number of transmission signals from the RTU and attach an identification of the device 214 to the usurped transmission signals. The usurped transmission signals that include the attached identification of the device 214 can be sent to other nodes within the communication system that are coupled to other devices. The usurped transmission signals that include the attached identification of the device 214 can be utilized to notify other devices and/or validate other devices within the communication system. In some embodiments, this information can be utilized to inform other devices within the communication system which devices (e.g. by their identification) are attached to which nodes (e.g., by their address) so that each device knows which encryption key or keys to be used for transmissions containing associated node address information. As described herein, the device 214 can process (e.g., encrypt, compress, etc.) signal transmissions from the RTU 202 once the properties of the communication system are determined and one or more of the other devices are validated.

The system 212 is beneficial over previous methods by simplifying signal transmission processing (e.g., encryption, compression, etc.) of legacy communication systems without having to configure a "bump in the wire" device as shown in FIG. 1. In addition, the device 214 does not require a power connection that is separate from the connections to the RTU 202 and/or modem 208. These benefits enable an installer with minimal knowledge of the legacy communication network to install the device 214, since the device 214 can automatically commission itself to a number of different communication systems without manual configuration of the device 214 and without additional power connections or mechanical support (e.g., mechanical support 107 as referenced in FIG. 1).

Figure 3:
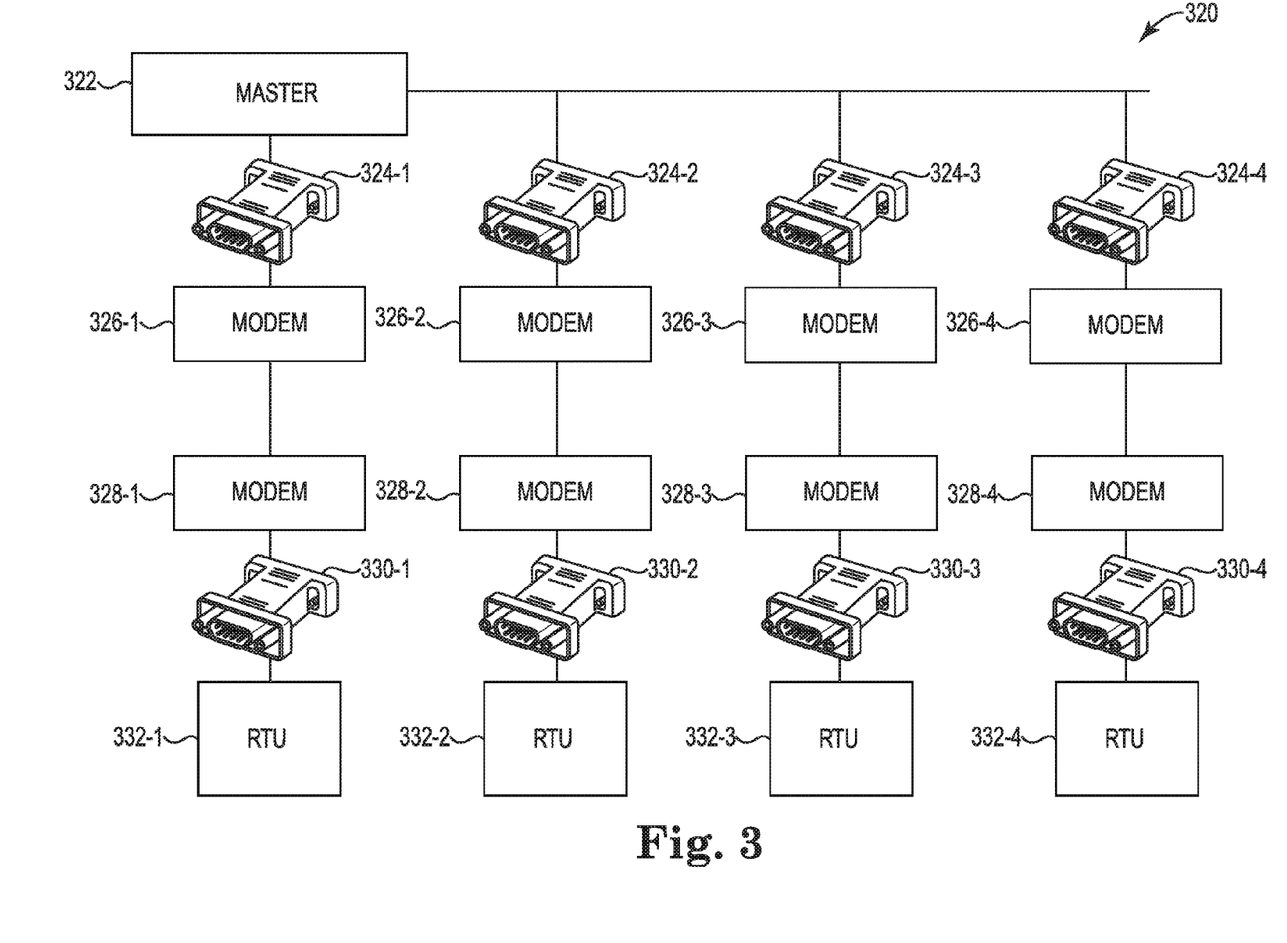

FIG. 3 is an example of a system 320 for auto-commissioning of devices in a communication network according to one or more embodiments of the present disclosure. The system 320 can represent a master/slave communication system. The master/slave communication system can include a master node (master) 322 and a number of slave nodes (slaves) 332-1, 332-2, 332-3, 332-4. In some embodiments, the master 322 may be two or more redundant (for fault tolerance) nodes that share the mastership responsibilities.

The master node 322 can be configured to control the number of slave nodes 332-1, 332-2, 332-3, 332-4. That is, the master node 322 can be utilized to control (e.g., change settings, give commands, etc.) each of the number of slave nodes 332-1, 332-2, 332-3, 332-4. For example, the master node 322 can be utilized to change a number of settings of the number of slave nodes 332-1, 332-2, 332-3, 332-4 via a number of transmission signals that can be sent to each of the number of slave nodes via a number of modems 326-1, 326-2, 326-3, 326-4 residing near the master node 322 and via a number of modems 328-1, 328-2, 328-3, 328-4 residing near slave nodes 332-1, 332-2, 332-3, 332-4. For example, a transmission signal can be sent from the master 322 through a device 324-1 that encrypts the transmission signal and the encrypted transmission signal can be sent by a modem 326-1 to a modem 328-1. When the modem 328-1 receives the encrypted transmission signal it can be decrypted by the device 330-1 and sent to an RTU 332-1.

The system 320 can include devices 324-1, 324-2, 324-3, 324-4 that are coupled to each modem 326-1, 326-2, 326-3, 326-4 that is coupled to the master 322. In addition, corresponding devices 330-1, 330-2, 330-3, 330-4 can be coupled to each of the corresponding RTUs 332-1, 332-2, 332-3, 332-4. In some embodiments the device 326-1 can be paired with a corresponding device 330-1. The paired devices can be configured to only validate the corresponding device of the paired devices. For example, if device 324-2 and device 330-2 are paired devices, the device 324-2 can only validate device 330-2 and device 330-2 can only validate device 324-2.

Validating the devices can include a first device usurping a transmission signal between the master 322 and an RTU 332-1, 332-2, 332-3, 332-4. For example, the device 324-3 can attach an ID of the device 324-3 to the usurped transmission signal and send the usurped transmission signal via modem 326-3. In this example, the usurped transmission signal can be received by the device 330-3 via modem 328-3 and the device 330-3 can validate the ID of device 324-3. In some embodiments, as described herein, the device 324-3 can be paired with device 330-3. That is, the device 324-3 can be configured to only validate the ID of device 330-3. In addition, the device 330-3 can be configured to only validate the ID of device 324-3. In some embodiments, the ID of the devices 324-3, 330-3 can have an associated secret cryptographic birth key (e.g., an identification configured or supplied when manufactured and an associated a key that is generated when the device is manufactured, etc.). That is, the paired devices can be manufactured to include a birth key. Thus, the birth key of a first device can correspond to a birth key of a second device when the first device and the second device are paired devices.

The devices 324-1, 324-2, 324-3, 324-4, 330-1, 330-2, 330-3, 330-4 can determine a number of properties of signal transitions between the master 322 and the RTUs 332-1, 332-2, 332-3, 332-4 when the devices 324-1, 324-2, 324-3, 324-4 are coupled (e.g., tangentially coupled, in-line/flow-through coupled, etc.) to the lines between each modem 326-1, 326-2, 326-3, 326-4 and the master 322 or coupled to the lines between each modem 330-1, 330-2, 330-3, 330-4 and the RTUs 332-1, 332-2, 332-3, 332-4, respectively. The number of properties can include, but are not limited to: a bit rate of the signal transitions, a protocol of the signal transmissions, a size of a stop bit, a number of bits between start and stop bits, and/or one or more locations (e.g., addresses) of nodes within the communication system 320.

In some embodiments, the devices 324-1, 324-2, 324-3, 324-4, 330-1, 330-2, 330-3, 330-4 can determine the properties of the signal transitions without interrupting the signal transitions being communicated between the master 322 and the RTUs 332-1, 332-2, 332-3, 332-4. That is, the devices 324-1, 324-2, 324-3, 324-4, 330-1, 330-2, 330-3, 330-4 can transparently replicate signal transitions from the input of the devices 324-1, 324-2, 324-3, 324-4, 330-1, 330-2, 330-3, 330-4 to the output of the devices 324-1, 324-2, 324-3, 324-4, 330-1, 330-2, 330-3, 330-4 without interrupting the signal transitions, or the devices 324-1, 324-2, 324-3, 324-4, 330-1, 330-2, 330-3, 330-4 can transparently observe the signal transitions that pass by them when they are tangentially coupled.

The devices 324-1, 324-2, 324-3, 324-4, 330-1, 330-2, 330-3, 330-4 can determine a bit rate of the communication network by observing signal transitions of the communication network. In some embodiments, the devices 324-1, 324-2, 324-3, 324-4, 330-1, 330-2, 330-3, 330-4 can determine the bit rate of the communication network by determining a minimum time between signal transitions that are sent and/or received between the master 322 and a corresponding RTU 332-1, 332-2, 332-3, 332-4. This differs from previous methods and devices in that no signals need to be transmitted specifically for the purpose of determining the bit rate. For example, a previous method would require the injection of a known signal, such as a string of repeated ASCII "U" characters.

The determination of bit rate according to the current disclosure passively observes existing signal transmissions without needing to modify the sender(s) in order for the sender(s) to transmit any known signals, as is required by the prior art. While the determination of bit rate according to the current disclosure is heuristic, the probability of it failing is so low that it can be ignored. A failure to determine bit rate correctly occurs only if the transmission never contains the bit sequence "010" or the bit sequence "101" (including start and stop bits if they are used).

The probability of failure can further be reduced by measuring the time between many signal transitions to determine the time periods between the multiple signal transitions, taking the differences among these periods, and determining the bit period to be the minimum of these differences. The bit rate is the inverse of the bit period. Errors in this process can be reduced by rounding the measured periods to the nearest multiple of the known smallest bit period. For example, the EIA/RS-232 standards limit the maximum bit rate to 20,000 bits per second. However, all significant protocols that use EIA/RS-232 have bit rates that are multiples of 300 bits per second. This makes the highest EIA/RS-232 compliant bit rate in common use 19,200 bits per second. This equates to a bit period of just over 52 µs. Thus, an embodiment according to the current disclosure would round all measured periods to the nearest multiple of 52 µs (or as close to 52 µs as the time period measurement mechanism allows) and select as the bit rate the multiple of 300 bits per second which has a bit period that is closest to the minimum difference of the measured time periods after rounding.

Additionally, the many popular protocols have transmissions which must contain the bit patterns (e.g., the bit sequence "010", the bit sequence "101", stop and start bits, etc.). This can guarantee successful selection of the correct bit rate. For example, the DNP3 protocol used for most North American SCADA networks requires transmissions to begin with a constant that contains both the "010" bit pattern and the "101" bit pattern, either of which is sufficient to determine the correct bit rate. While these protocols guarantee a successful bit rate determination, the determination of bit rate according to the current disclosure does not depend on these bit patterns required by some protocols or some formats (e.g., start/stop bits) always being present, because the method cannot know a priori if any of these protocols or formats will be in use on the signal transitions it is observing.

The devices 324-1, 324-2, 324-3, 324-4, 330-1, 330-2, 330-3, 330-4 can determine a protocol of signal transmissions by observing protocol signatures of the signal transmissions between the master 322 and a corresponding RTU 332-1, 332-2, 332-3, 332-4. In some embodiments, the devices 324-1, 324-2, 324-3, 324-4, 330-1, 330-2, 330-3, 330-4 can determine a protocol of the signal transmissions by observing a unique pattern at a beginning of each signal transmission. For example, the unique pattern can be a hexadecimal value sequence such as 0x05 or 0x64. In this example, the devices 324-1, 324-2, 324-3, 324-4, 330-1, 330-2, 330-3, 330-4 can observe the hexadecimal value sequence and determine that the hexadecimal value corresponds to DNP3. In some embodiments, the devices 324-1, 324-2, 324-3, 324-4, 330-1, 330-2, 330-3, 330-4 can determine a protocol of the signal transmissions by observing check data (e.g., checksums, cyclic redundancy rate (CRC), etc.) of the signal transitions and/or character framing of the signal transmissions.

In some embodiments, the devices 324-1, 324-2, 324-3, 324-4, 330-1, 330-2, 330-3, 330-4 can determine start and stop bits (start/stop bits) by observing the transitions of the communication signal. In some of these embodiments, the location of start and stop bits can be found by observing the bit transition pattern "01" repeating at a fixed interval throughout the transmission, where this fixed interval is in the range of 7 to 12 bit periods. In some embodiments, the devices 324-1, 324-2, 324-3, 324-4, 330-1, 330-2, 330-3, 330-4 can determine the start/stop bits of the signal transitions based on the protocol that is determined by the devices 324-1, 324-2, 324-3, 324-4, 330-1, 330-2, 330-3, 330-4.

In some embodiments, the devices 324-1, 324-2, 324-3, 324-4, 330-1, 330-2, 330-3, 330-4 can determine a location of each corresponding devices 324-1, 324-2, 324-3, 324-4, 330-1, 330-2, 330-3, 330-4. For example, the device 324-4 can determine a location of the paired device 330-4. Determining the location of the devices 324-1, 324-2, 324-3, 324-4, 330-1, 330-2, 330-3, 330-4 can include determining if the device 324-1, 324-2, 324-3, 324-4, 330-1, 330-2, 330-3, 330-4 is coupled to the master 322 or if the device 324-1, 324-2, 324-3, 324-4, 330-1, 330-2, 330-3, 330-4 is coupled to a RTU 330-1, 330-2, 330-3, 330-4. In some embodiments, the determination of whether a device is coupled to a master or an RTU can be accomplished by first determining the direction of communication flow (e.g., from a local node or nodes out to the rest of the network, or in from the rest of the network to a local node or nodes) and then determining if transmissions flowing in a particular direction are from a master or an RTU. The latter can be determined by: particular bits in a transmission (e.g., DNP3 has bits dedicated to this purpose); recognizing particular patterns in address fields for source or destination in the transmission; and/or determining in which direction responses flow. In some embodiments, responses can be determined by: specific bits in the transmission; recognizing particular patterns in address fields for source or destination in the transmission; the addresses used in sequences of transmissions; and/or the timing between transmissions (e.g., for two sequential transmissions traveling in opposite directions that occur within a certain time of each other, it can be assumed that the second transmission is a response to the first).

In some embodiments, a first device of a set of paired devices can determine an address of a node coupled to a second device of the set of paired devices. The address of the node can be determined by observing the transmissions from the node and extracting the address based on a location of the address within the determined protocol of the signal transmissions between the first device and the second device.

In some embodiments, one of the paired devices 324-1, 324-2, 324-3, 324-4, 330-1, 330-2, 330-3, 330-4 can determine the properties of the signal transitions and send the properties to the other paired device 324-1, 324-2, 324-3, 324-4, 330-1, 330-2, 330-3, 330-4 via a usurped transmission. For example, the paired device 324-1, 324-2, 324-3, 324-4, 330-1, 330-2, 330-3, 330-4 can include device 324-2 and device 330-2. In this example, the device 324-2 can determine the properties of the signal transitions between the master 322 and the RTUs 330-1, 330-2, 330-3, 330-4. When the device 324-2 determines the properties of the signal transition, the device 324-2 can send a usurped transmission that includes the properties of the signal transition to device 330-2. In some embodiments, the usurped transmission can be utilized to validate (e.g., confirm) that the devices 324-1, 324-2, 324-3, 324-4, 330-1, 330-2, 330-3, 330-4 are paired devices as described herein. In some embodiments, the devices 324-1, 324-2, 324-3, 324-4, 330-1, 330-2, 330-3, 330-4 can utilize the usurped transmission to notify other devices 324-1, 324-2, 324-3, 324-4, 330-1, 330-2, 330-3, 330-4 that processing (e.g., encryption, compression, etc.) can begin.

In some embodiments, the information that could be sent via usurped transmissions, as described herein, is instead sent during times between transmissions that otherwise would be idle.

In some embodiments, the devices 324-1, 324-2, 324-3, 324-4, 330-1, 330-2, 330-3, 330-4 can change the protocol-defined format of a transmission. The transmission format can be changed to distinguish transmissions that have been usurped by the devices 324-1, 324-2, 324-3, 324-4, 330-1, 330-2, 330-3, 330-4. For example, the transmission format of DNP3 can be changed such that the constant at the beginning of a usurped transmission is transformed from 0x05 to 0xC5. The devices 324-1, 324-2, 324-3, 324-4, 330-1, 330-2, 330-3, 330-4 can receive a transmission with a changed transmission format and not pass the usurped transmission to the node coupled to the corresponding device 324-1, 324-2, 324-3, 324-4, 330-1, 330-2, 330-3, 330-4. For example, the device 324-3 can change the transmission format of DNP3 to start with 0xC5 and pass along the usurped transmission to device 330-3 via modems 326-3 and 328-3. In this example, the device 330-3 can receive the transmission and determine that the transmission has been usurped and includes details from the device 324-3 and should not be passed onto RTU 332-3. In some embodiments, the usurped message can contain both the original contents of the message and the details added by the device. In these embodiments, a receiving device can extract the added details, undo the changes to the format, and send the original message on to its attached node. It can be advantageous for the protocol changes to occur as close to the beginning of a transmission as possible. Such placement of changes can minimize any delay at receiving devices that must determine if the changes have been made or not. This determination may be needed to make decisions about transmission processing that depend on whether these changes have been made In some embodiments, the devices 324-1, 324-2, 324-3, 324-4, 330-1, 330-2, 330-3, 330-4 can send usurped transmissions in the clear, no part of which is encrypted. In some embodiments, all or part of usurped messages can be encrypted for integrity and authentication. In some embodiments, all or part of usurped messages can be encrypted for secrecy. In some embodiments, all or part of usurped messages can be cryptographically signed for authentication.

The devices 324-1, 324-2, 324-3, 324-4, 330-1, 330-2, 330-3, 330-4 can begin encrypting/decrypting communication between the master 322 and the RTUs 332-1, 332-2, 332-3, 332-4 when the devices 324-1, 324-2, 324-3, 324-4, 330-1, 330-2, 330-3, 330-4 determine the properties of the signal transitions of the communication network and each of the devices 324-1, 324-2, 324-3, 324-4 validate the corresponding devices 330-1, 330-2, 330-3, 330-4. For example, the device 324-1 can validate the device 330-1. In another example, the device 330-1 can validate the device 324-1. In another example, the device 324-1 can validate the device 330-1 and the device 330-1 can also validate the device 324-1.

In some embodiments, the devices 324-1, 324-2, 324-3, 324-4, 330-1, 330-2, 330-3, 330-4 can encrypt/decrypt the transmissions of the communication network by encrypting/decrypting the transmissions bit by bit. For example, device 324-1 can receive each bit of the transmission from the master 322 and encrypt each bit as it is received and send the encrypted bit to the modem 326-1 before the next bit of the transmission is received by device 324-1 from master 322. In this example, the device 330-1 can receive the transmission from the modem 328-1 and decrypt the transmission bit by bit as it is received from the modem 328-1 and send each bit of the transmission before processing the next bit to the RTU 332-1. In some embodiments, other processing such as compression/decompression can be performed in the same bit by bit manner.

Encrypting and/or decrypting the transmissions can include encrypting the transmission in a key that is unique to each of the devices 324-1, 324-2, 324-3, 324-4, 330-1, 330-2, 330-3, 330-4 and/or each of the paired devices 324-1, 324-2, 324-3, 324-4, 330-1, 330-2, 330-3, 330-4. For example, the device pair of device 324-4 and device 330-4 can include a secret key that is unique to each device or to the device pair. In either case, the secret key or keys that can be used within a pair can be known only to that pair and no other pair of devices or single device. For example, the secret key can be a birth key that is established when the device pair is manufactured. In some embodiments, a private key can be updated by usurping a transmissions and changing the protocol signature as described herein. The usurped transmissions can be utilized to send data from a first device 324-1, 324-2, 324-3, 324-4, 330-1, 330-2, 330-3, 330-4 to a second device 324-1, 324-2, 324-3, 324-4, 330-1, 330-2, 330-3, 330-4 that indicates the private key is to be updated and what the new private key should be.

The system 320 can operate as a master/slave communication network as described herein. In some embodiments, the system 320 can be implemented on a non-master/slave communication network. That is, the system 320 can be utilized in a legacy communication system that does not utilize a master/slave communication network. For example, system 320 can be utilized in a legacy communication system where nodes (RTUs) communicate with each other without the use of a master.

The system 320 can provide processing (e.g., encryption, compression, etc.) of transmissions between nodes in a communication network with relatively low latency (e.g., 1 bit latency). In addition, the system 320 can provide encryption of transmissions between nodes in a communication network with a relatively limited understanding of the communication network. That is, some of the properties of the transmissions on the communication network do not need to be known and the devices do not need to be configured to a known set of properties of the transmissions. The system 320 can also: eliminate human error in configuring a "bump in the wire" encryption device (e.g., "bump in the wire" encryption device 106 as referenced in FIG. 1), eliminate a need for a computing device to configure the device, eliminate a need for an additional power supply (e.g., power supply 110 as referenced in FIG. 1), and/or eliminate a need for a mechanical support (e.g., mechanical support 107).

Figure 4:
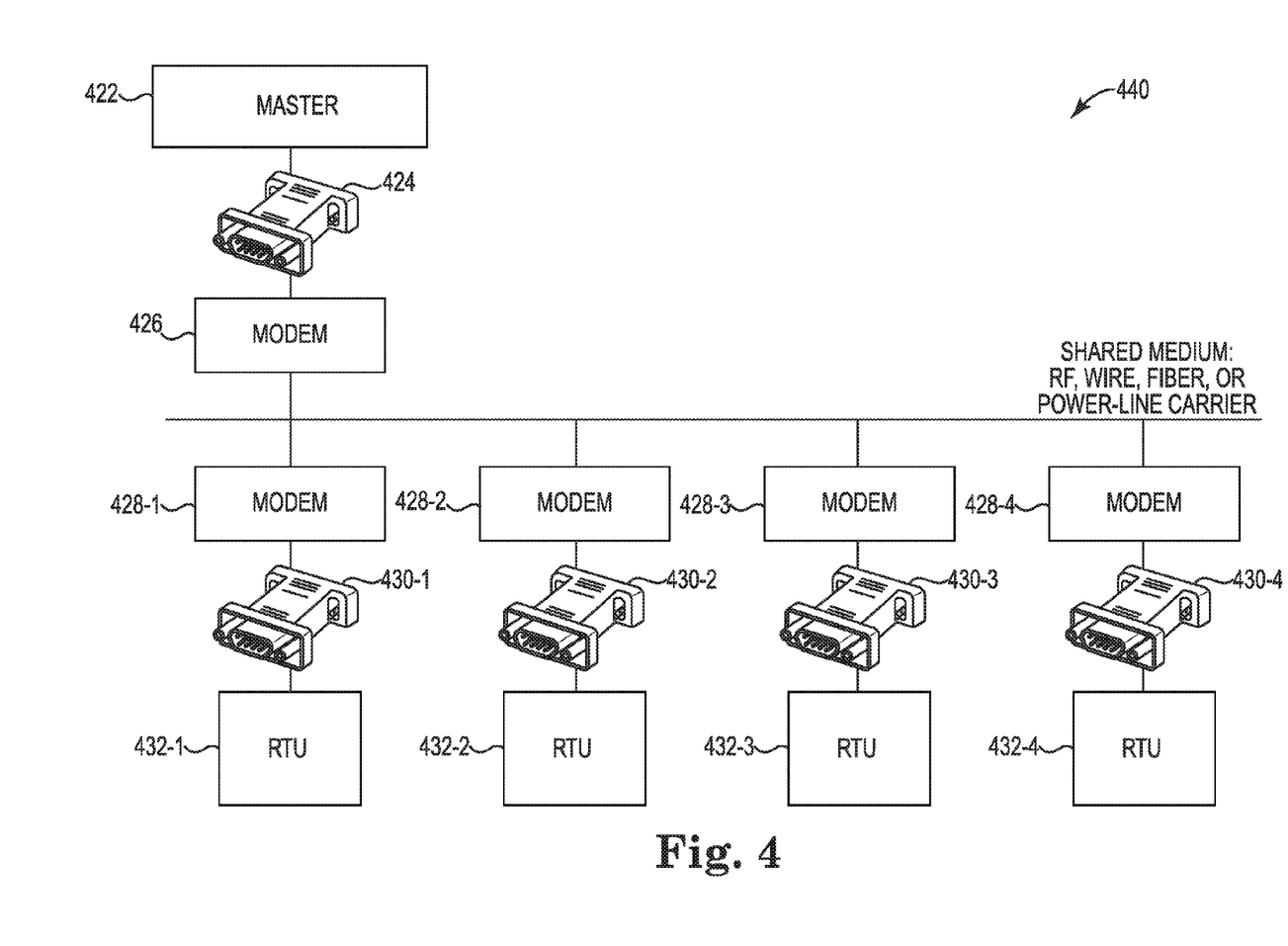

FIG. 4 is an example of a system 440 for auto-commissioning of devices in a communication network according to one or more embodiments of the present disclosure. The system 440 can be a communication network similar to the communication network associated with system 320 as referenced in FIG. 3. That is, the system 440 can include devices 424, 430-1, 430-2, 430-3, 430-4 that are coupled to nodes (e.g., master 422, RTUs 432-1, 432-2, 432-3, 432-4) of a master/slave communication network.

The system 440 differs from the system 320 as referenced in FIG. 3 in that there is a single device 424 that is coupled to the link between the master 422 and a modem 426. The system 440 does not utilize device pairs as described in reference to system 320 in FIG. 3. That is, the device 424 can process (e.g., encrypt, etc.) transmissions from the master 422 that are being sent to any of the RTUs 432-1, 432-2, 432-3, 432-4. In addition, the device 424 can receive and process (e.g., decrypt, etc.) the transmissions from any of the RTUs 432-1, 432-2, 432-3, 432-4 that are being sent to the master 422 via a corresponding modem 428-1, 428-2, 428-3, 428-4 of the RTU and the modem 426.

When the devices 424, 430-1, 430-2, 430-3, 430-4 are coupled to the link between a node and a modem 426, 428-1, 428-2, 428-3, 428-4, the devices 424, 430-1, 430-2, 430-3, 430-4 can determine a number of properties of the signal transitions between the nodes as described herein. The number of properties can include, but are not limited to: a bit rate of the signal transitions, a protocol of the signal transmissions, a size of a stop bit, a number of bits between start and stop bits, and/or one or more locations (e.g., addresses) of nodes (e.g., master 422, RTUs 432-1, 432-2, 432-3, 432-4, etc.) within the communication system 440. The number of properties can be determined by observing the transmission signals between the master 422 and the RTUs 432-1, 432-2, 432-3, 432-4 as described herein.

In some embodiments, each of the devices 430-1, 430-2, 430-3, 430-4 is assigned a unique identification (ID). In certain embodiments, each of the devices 430-1, 430-2, 430-3, 430-4 is assigned a unique identification and a unique secret key. Since the devices 424, 430-1, 430-2, 430-3, 430-4 are not paired devices as described in reference to FIG. 3, it is important to determine a location of the devices 424, 430-1, 430-2, 430-3, 430-4 and/or a functionality (e.g., master, slave, etc.) of the nodes coupled to the devices 424, 430-1, 430-2, 430-3, 430-4. In some embodiments, the device 424 is provided with information relating to the devices 430-1, 430-2, 430-3, 430-4 associated with slave nodes. For example, the information provided to the device 424 can include a unique serial number, a unique secret key, and/or a model number of each of the devices 430-1, 430-2, 430-3, 430-4.

Once the devices 424, 430-1, 430-2, 430-3, 430-4 determine the properties of the signal transitions of the communication network the devices 424, 430-1, 430-2, 430-3, 430-4 can utilize the determined protocol of the signal transitions to determine an address of the node that is coupled to each of the devices 424, 430-1, 430-2, 430-3, 430-4. The address of the node can be determined by observing the transmissions from the node and extracting the address of the node based on a location of the address within the determined protocol. That is, a particular protocol can have a particular location with the address of the node and the devices 424, 430-1, 430-2, 430-3, 430-4 can extract the address information from the known location within the transmission. In addition, the devices 424, 430-1, 430-2, 430-3, 430-4 can determine whether the node that is coupled to each of the devices 424, 430-1, 430-2, 430-3, 430-4 is a master node 422 or a slave node (e.g., RTUs 432-1, 432-2, 432-3, 432-4) by observing the transmissions from a node and utilizing the protocol to extract the information from the transmission.

In some embodiments, a device can usurp a transmission, as described herein, to share the address information and/or functionality information of a node with other devices 424, 430-1, 430-2, 430-3, 430-4. In some embodiments the device 424 that is coupled to the master 422 can usurp a number of transmissions that are being sent to each of the devices 430-1, 430-2, 430-3, 430-4 that are coupled to the RTUs 432-1, 432-2, 432-3, 432-4 to notify each of the devices 430-1, 430-2, 430-3, 430-4 that device 424 is coupled to the master 422.

In some embodiments, each of the devices 430-1, 430-2, 430-3, 430-4 that are coupled to the RTUs 432-1, 432-2, 432-3, 432-4 can usurp a transmission, as described herein, to share the address information and functionality information with the device 424 to notify the device 424 that the devices 430-1, 430-2, 430-3, 430-4 are coupled to the slave RTUs 432-1, 432-2, 432-3, 432-4. In some embodiments, the address information and/or functionality information can include an ID of a node, a serial number of a node, and/or other information that is specific to the node.

The system 440 can utilize a number of different schemes for providing and updating keys for the devices 424, 430-1, 430-2, 430-3, 430-4. For example, the system 440 can utilize a key distribution center. The key distribution center can know the birth keys or other keys of the devices 424, 430-1, 430-2, 430-3, 430-4 and can assign session keys to each of the devices 424, 430-1, 430-2, 430-3, 430-4. In some embodiments, the key distribution center can be responsible for updating the session keys. In some embodiments, each of the devices 430-1, 430-2, 430-3, 430-4 can know the public key of device 424 and can use public-key cryptography to establish an initial secret key shared between itself and device 424.

The system 440 can provide transmissions between nodes in a communication network with relatively low latency (e.g., 1 bit latency). In addition, the system 440 can provide transmissions between nodes in a communication network with a relatively limited understanding of the communication network. That is, the properties of the transmissions on the communication network do not need to be known and the devices do not need to be configured to a known set of properties for all characteristics of the network. The system 440 can also: eliminate human error in configuring a "bump in the wire" encryption device (e.g., "bump in the wire" encryption device 106 as referenced in FIG. 1), eliminate a need for a computing device to configure the device, eliminate a need for an additional power supply (e.g., power supply 110 as referenced in FIG. 1), and/or eliminate a need for a mechanical support (e.g., mechanical support 107.

Figure 5:
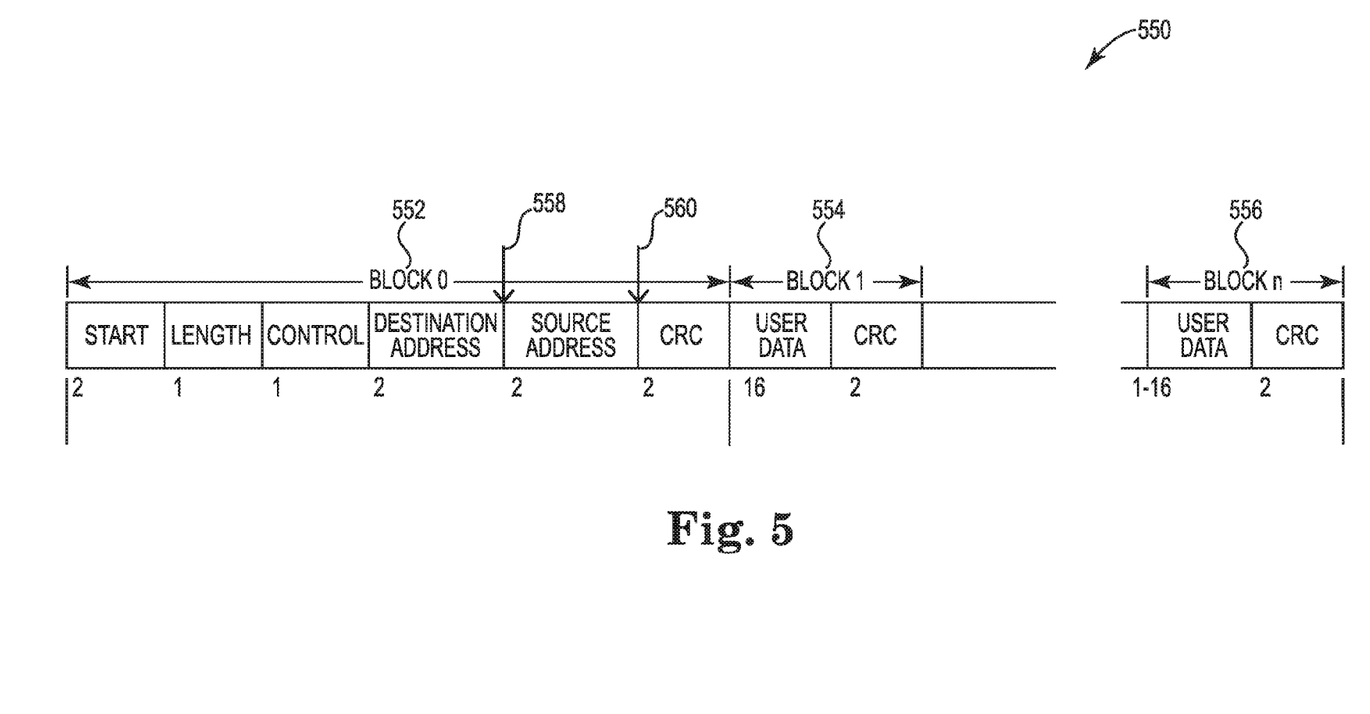

FIG. 5 is an example of a diagram 550 of transmissions properties of a network protocol according to one or more embodiments of the present disclosure. Words within the squares of the diagram 550 can represent the use of fields within a transmission. The line of numbers beneath the squares indicate a representative number of bytes that may be used in the associated field. As described herein, the devices can passively observe signal transitions/transmissions being sent between nodes within a communication network. As used herein, passively observing the signal transitions/transmissions includes observing properties of the signal transitions/transmissions without interrupting or changing the sending and/or receiving of signal transitions/ transmissions. Observing the signal transitions can enable the devices to extract properties of the signal transitions to enable the devices to automatically commission based on the extracted properties.

The diagram 550 of the transmission protocol properties can include a first block 552 (e.g., block 0, header, etc.). In some embodiments, the first block 552 can be a fixed length header of ten bytes. As described herein, a protocol-identifying bit pattern and/or bit relationships can be extracted from the first block 552. In addition, the destination address and source address can be extracted from the first block 552. In some embodiments, the devices can extract information relating to the functionality of the node that is coupled to the devices. For example, a device can determine that it is coupled to a master node or a slave node at or prior to position 558 in the first block 552. In another example, the device can determine that it is coupled to a slave node at position 560 in the first block 552. In this example, the device can observe the source address and determine that it is coupled to a slave node.

In some embodiments, address information within a transmission can be used to determine which cryptographic key or keys should be used for this transmission. In some embodiments, the knowledge of whether the local node is a master or a slave can be combined with the address information within the transmission to determine which cryptographic key or keys should be used for this transmission. As described herein, the knowledge of the direction of transmission flow (from local to the rest of the network or from the rest of the network to local) can also be used as part of the determination of which cryptographic key or keys should be used.

In embodiments for which transmission address information is used to select which cryptographic key or keys should be used for that transmission, the selection of keys cannot be determined until sufficient address information has been observed by an encryption device. For example, for systems which use unique keys for each RTU, a master node encryption device concludes knowledge of which key or keys to use for encrypting a transmission to an RTU at position 558 within a transmission; whereas, the same device receiving a message from an RTU does not conclude knowledge of which key or keys to use for decryption until position 560.

In some embodiments, there can be a desire to provide cryptographic integrity and authenticity protection to some or all of the transmission's content prior to the point where sufficient address information has been observed to select the correct cryptographic key or keys; for example, protecting the start, length, and control fields within block 552. It is further desired that this protection should not add any latency (delay) by the cryptographic processing. This protection can be provided by using a cryptographic hash or similar function on the transmission's content prior to determining which cryptographic key or keys are to be used and then incorporating the result of this function within the protection provided by a cryptographically keyed integrity mechanism. This mechanism is particularly advantageous to those encryption mechanisms that provide secrecy and integrity in a single pass over the data.

The diagram 550 of the transmission properties also includes a second block 554 (e.g., block 1). The second block can include user related data and/or a cyclic redundancy rate (CRC). As described herein, the CRC can be extracted from the transmission properties to determine or confirm the protocol of the transmission. In some embodiments, the CRC or other frame check sequence information can be used as part of the data that provides integrity and authenticity confirmation.

The diagram 550 of the transmission properties also includes a number of additional blocks 556. In some embodiments, the second block 554 and additional blocks 556 can include a maximum of sixteen total blocks (e.g., n=16 or less, etc.). In some embodiments the second block and additional blocks can have a maximum quantity of data that is 250 bytes.

Figure 6:
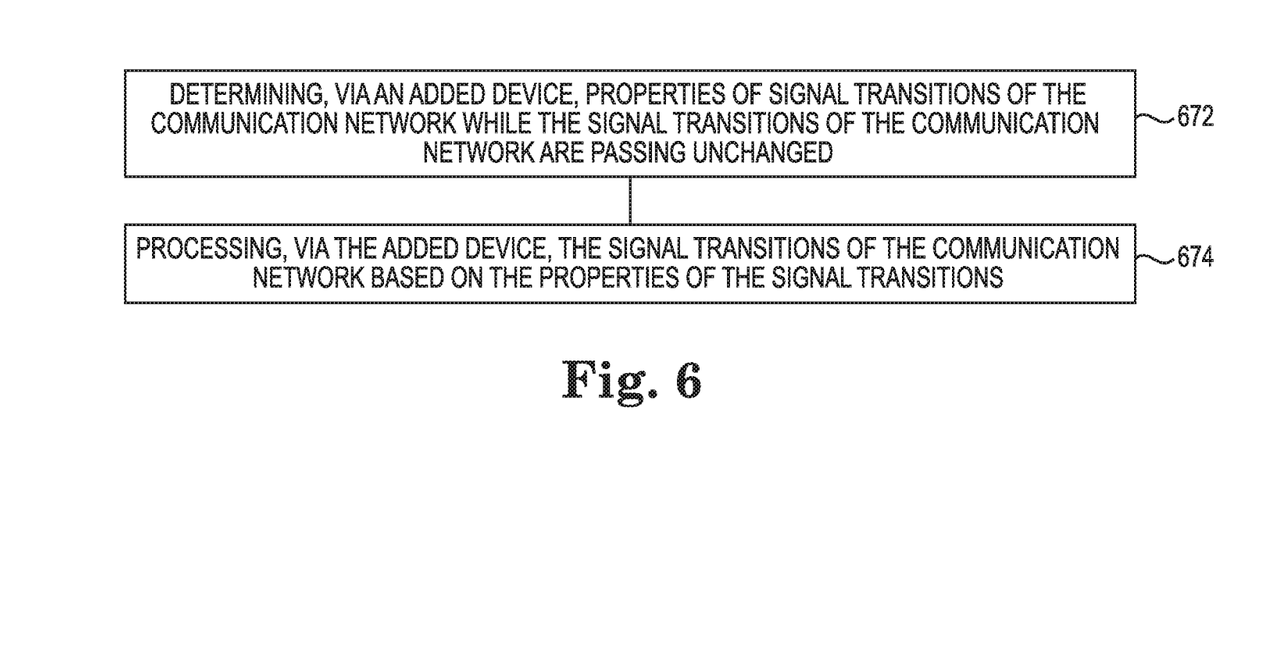

FIG. 6 is an example of a method for auto-commissioning of devices in a communication network according to one or more embodiments of the present disclosure. The method can be performed by the number of devices as described herein. In some embodiments, the devices include hardware and/or logic to perform the method when the devices are coupled to a link between a network interface and the remainder of the interface's node. In some embodiments, the devices include hardware and/or logic to perform the method when the devices are tangentially coupled to the link between a network interface and the remainder of that interface's node.

At box 672, the method can include determining, via an added device, properties of signal transitions of the communication network while the signal transitions of the communication network are passing unchanged. Determining properties of signal transitions can be performed via a device as described herein. The properties can be determined by observing signal transitions in a communication network that are passing through the device (e.g., in-line connection) and/or past the device (tangential connection). As described herein, the properties of the signal transitions can be determined as the signal transitions are passing the device. In some embodiments, the properties are determined without changing the signal transitions. As described herein, the signal transitions may not be changed or altered until the device is validated. In some embodiments, the signal transitions may not be changed or altered until the device and a pair device of the device are both validated.

In some embodiments, determining properties of signal transitions can include determining a bit rate of the communication network by observing signal transitions of the communication network. In some embodiments, determining properties of signal transitions can include determining a protocol of the communication network by observing protocol signatures of the signal transitions. In some embodiments, determining properties of signal transitions can include determining stop/start bit locations of the signal transitions. In some embodiments, determining properties of signal transitions can include determining a location of the device coupled to nodes of the communication network.

At box 674, the method can include processing, via the added device, the signal transitions of the communication network based on the properties of the signal transitions. In some embodiments, the processing can include encrypting and/or decrypting transmissions. In some embodiments, the processing only begins once the device is validated as described herein.

In some embodiments, the method can include encrypting transmissions of the communication network, via the device, based on the properties of the transmissions. Encrypting the transmissions can include a first device coupled to a first node encrypting each bit of a transmission based on a private key (e.g., birth key, etc.) and a second device coupled to a second node decrypting each bit of the transmission based on a private key.

In addition, the method can include validating the determined properties of the transmission signal by generating a scheme comprising the determined properties and testing the generated scheme. Generating the scheme can include generating a clear transmission that includes all or some of the signal transmission properties that are determined by the devices. In some embodiments, the generated scheme is sent to a different device coupled to a different node to validate the determined properties.

In some embodiments, the method can include usurping a transmission signal of the communication network, via the device. Usurping a transmission signal can include attaching information to an existing transmission signal that is being sent from a first node to a second node.

In some embodiments, the method can include attaching an identification of the device to the transmission signal. In some embodiments, attaching the identification of the device includes changing a protocol signature of the transmission with a differential protocol signature. Changing the protocol signature can give an indication to a device receiving the transmission that the transmission includes information relating to other devices. In some embodiments, changing the protocol signature is an indication to the receiving device not to pass some or all of the transmission to the receiving node. In some embodiments, the method can include receiving an encrypted birth key of a plurality of other devices coupled to other nodes of the communication network. As described herein, for some embodiments, the birth key can be manufactured into the device.

Figure 7:
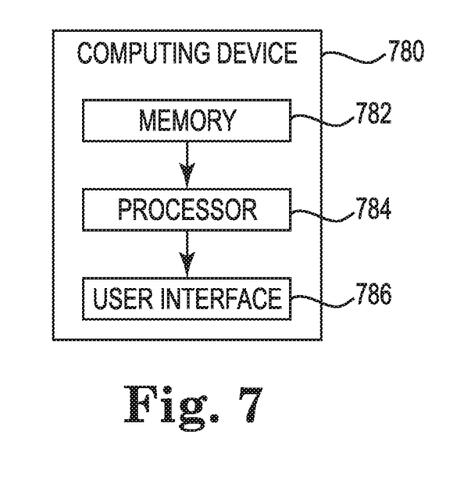

FIG. 7 is an example of a diagram of a device for open architecture security according to one or more embodiments of the present disclosure. Computing device 780 can be, for example, a network controller as described herein, among other types of computing devices.

As shown in FIG. 7, computing device 780 includes a memory 782 and a processor 784 coupled to memory 782. Memory 782 can be any type of storage medium that can be accessed by processor 784 to perform various examples of the present disclosure. For example, memory 782 can be a non-transitory computer readable medium having computer readable instructions (e.g., computer program instructions) stored thereon that are executable by processor 784 to determine a deployment of an access control system in accordance with one or more embodiments of the present disclosure.

Memory 782 can be volatile or nonvolatile memory. Memory 782 can also be removable (e.g., portable) memory, or non-removable (e.g., internal) memory. For example, memory 782 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 782 is illustrated as being located in computing device 780, embodiments of the present disclosure are not so limited. For example, memory 782 can also be located internal to another computing resource (e.g., enabling computer readable instructions to be downloaded over the Internet or another wired or wireless connection).

As shown in FIG. 7, computing device 780 can also include a user interface 786. User interface 786 can include, for example, a display (e.g., a screen, an LED light, etc.). The display can be, for instance, a touch-screen (e.g., the display can include touch-screen capabilities). User interface 786 (e.g., the display of user interface 786) can provide (e.g., display and/or present) information to a user of computing device 780.

Additionally, computing device 780 can receive information from the user of computing device 780 through an interaction with the user via user interface 786. For example, computing device 780 (e.g., the display of user interface 786) can receive input from the user via user interface 786. The user can enter the input into computing device 780 using, for instance, a mouse and/or keyboard associated with computing device 780, or by touching the display of user interface 786 in embodiments in which the display includes touch-screen capabilities (e.g., embodiments in which the display is a touch screen).

As used herein, "logic" is an alternative or additional processing resource to execute the actions and/or functions, etc., described herein, which includes hardware (e.g., various forms of transistor logic, application specific integrated circuits (ASICs), etc.), field programmable gate arrays (FPGAs), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for auto-commissioning of devices in a communication network, comprising:
   determining, via an added device, properties of signal transitions of the communication network while the signal transitions of the communication network are passing unchanged, wherein determining the properties of the signal transitions includes passively observing unmodified signal transitions pre-existing in the communication network and passively determining a protocol of the communication network by observing protocol signatures of the signal transitions; and
   processing, via the added device, the signal transitions of the communication network based on the properties of the signal transitions.

2. The method of claim 1, wherein determining properties of the signal transitions comprises:
   determining, via the added device, a protocol of the signal transitions;
   determining, via the added device, a size of a stop bit;
   determining, via the added device, a number of bits between a start bit and a stop bit; and
   determining, via the added device, a location of a node within the communication system.

3. The method of claim 1, comprising:
   processing, via the added device, content of a transmission bit by bit with a cryptographic hash prior to determining which cryptographic key is to be used.

4. The method of claim 1, comprising:
   usurping, via the added device, a transmission signal of the communication network; and
   attaching, via the added device, an identification of a node coupled to the added device to the transmission signal.

5. The method of claim 1, comprising:
   sending a transmission signal during a time that would otherwise be an idle time of the communication network; and
   attaching an identification of the added device to the transmission signal.

6. The method of claim 1, comprising determining, by the added device, a direction of communication flow.

7. The method of claim 1, comprising:
   determining, via the added device, an address of a node to which the added device is attached; and
   sending, via the added device, the address of the node to a number of other added devices.

8. The method of claim 1, comprising encrypting transmission signals with no greater than a one bit latency of the transmission signals.

9. The method of claim 1, comprising scavenging power, via the added device, from a node to which the added device is connected.

10. The method of claim 1, wherein the added device has a paired device and wherein the added device includes a key that is identifiable by the paired device and the paired device includes a corresponding key that is identifiable by the added device.

11. The method of claim 1, wherein the added device includes device information for a number of other added devices and corresponding keys for the number of other added devices.

12. A non-transitory machine readable medium storing instructions executable by a processing resource to cause a computing device to:
   determine properties of signal transitions in a communication network, wherein determining the properties of the signal transitions comprise passively observing unmodified signal transitions pre-existing in the communication network and passively determining a protocol of the communication network by observing protocol signatures of the signal transitions;
   receive device identification information from a plurality of added devices coupled to nodes of the communication network utilizing the determined properties, wherein the device identification information is included within a message altered by the plurality of added devices;
   validate the device identification information received from the plurality of added devices; and
   receive processed signal transitions from the plurality of added devices.

13. The medium of claim 12, wherein instructions to validate the received device identification information includes instructions to compare the received device identification information to stored device identification information or calculated device identification information.

14. The medium of claim 12, comprising instructions to determine a validated device based on information within a message having an altered protocol signature of a received signal transmission.

15. The medium of claim 12, comprising instructions to recognize particular bit patterns in the signal transmission to determine if a device of the plurality of devices is coupled to a particular type of node.

16. The medium of claim 12, comprising instructions to transparently replicate signal transitions from an input of a device to an output of the device.

17. An auto-commissioning of devices in a communication network system, comprising:
a first device and a second device, wherein the first device couples a first computing device with a first network interface and the second device couples a second computing device with a second network interface, each of the devices comprising instructions to:
determine properties of signal transitions of the communication network between the first device and the second device, wherein the properties of the signal transitions comprise passively observing unmodified signal transitions pre-existing in the communication network and passively determining a protocol of the communication network by observing protocol signatures of the signal transitions;
attach an identification to a transmitted signal between the first device and the second device; and
process transmission signals between the first computing device and the second computing device when the identification is validated.

18. The system of claim 17, wherein the first device is configured to determine a bit rate between the first device and the second device.

19. The system of claim 18, wherein the first device is configured to determine the bit rate with instructions to determine a minimum time between signal transitions that are sent or received between a master device coupled to the first device and a slave device coupled to the second device.

* * * * *